(12) United States Patent
Heinrich et al.

(10) Patent No.: US 10,847,817 B2
(45) Date of Patent: Nov. 24, 2020

(54) METHOD FOR DETERMINING A CONTENT OF A GAS COMPONENT IN A GAS MIXTURE CONVEYED IN A RECIRCULATING MANNER VIA A FUEL CELL

(71) Applicants: AUDI AG, Ingolstadt (DE); Volkswagen AG, Wolfsburg (DE)

(72) Inventors: Harald Heinrich, Braunschweig (DE); Wolfgang Hable, Braunschweig (DE); Torsten Schwarz, Wasbüttel (DE)

(73) Assignees: VOLKSWAGEN AG, Wolfsburg (DE); AUDI AG, Ingolstadt (DE)

( * ) Notice: Subject to any disclaimer, the term of this patent is extended or adjusted under 35 U.S.C. 154(b) by 102 days.

(21) Appl. No.: 16/072,160

(22) PCT Filed: Jan. 25, 2017

(86) PCT No.: PCT/EP2017/051475
§ 371 (c)(1),
(2) Date: Jul. 23, 2018

(87) PCT Pub. No.: WO2017/129581
PCT Pub. Date: Aug. 3, 2017

(65) Prior Publication Data
US 2019/0036133 A1 Jan. 31, 2019

(30) Foreign Application Priority Data

Jan. 28, 2016 (DE) .................. 10 2016 201 265

(51) Int. Cl.
*H01M 8/04089* (2016.01)
*H01M 8/0438* (2016.01)
(Continued)

(52) U.S. Cl.
CPC ..... *H01M 8/04097* (2013.01); *H01M 8/0441* (2013.01); *H01M 8/0447* (2013.01);
(Continued)

(58) Field of Classification Search
CPC ......... H01M 8/04097; H01M 8/04082; H01M 8/04111; H01M 8/04201; H01M 8/04328;
(Continued)

(56) References Cited

U.S. PATENT DOCUMENTS

| | | | |
|---|---|---|---|
| 2005/0244686 A1 | 11/2005 | Kamihara | |
| 2009/0280366 A1* | 11/2009 | Baaser | H01M 8/04097 429/410 |
| 2009/0280373 A1* | 11/2009 | Baaser | H01M 8/04097 429/413 |

FOREIGN PATENT DOCUMENTS

| | | |
|---|---|---|
| DE | 102004063533 A1 | 7/2006 |
| DE | 102009019836 A1 | 12/2009 |

(Continued)

*Primary Examiner* — Sean P Cullen
(74) *Attorney, Agent, or Firm* — Seed IP Law Group LLP

(57) ABSTRACT

The invention relates to a method to determine a content of a gas component in a gas mixture delivered recirculating through an anode chamber (12) or a cathode chamber (13) of a fuel cell (10), wherein the delivery takes place via a delivery device (26) functioning according to the positive displacement principle. The invention also relates to a fuel cell system (100) configured to execute the method.
According to the invention, the content of the gas component is determined depending on geometric parameters (V, ξ) and operating parameters (n, U, I) of the delivery device (26), as well as on thermodynamic state variables (p, T) of the gas mixture. The sought target quantity, for example a hydrogen component of an anode gas, can thus be determined in a simple and robust manner from quantities that are already known or measured.

15 Claims, 3 Drawing Sheets

Figure 1:
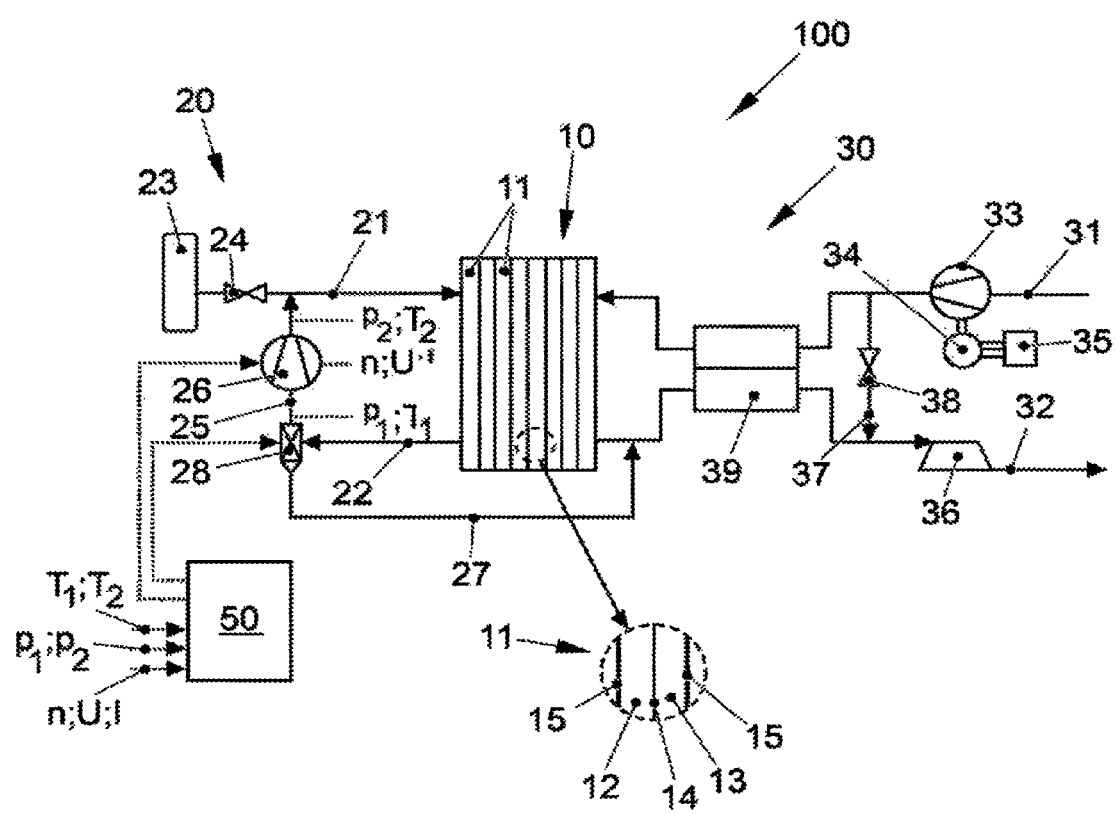

(51) Int. Cl.
*H01M 8/04111* (2016.01)
*H01M 8/04746* (2016.01)
*H01M 8/04701* (2016.01)
*H01M 8/0432* (2016.01)
*H01M 8/04791* (2016.01)
*H01M 8/04082* (2016.01)
*H01M 8/0444* (2016.01)
*H01M 8/04537* (2016.01)
*H01M 8/04992* (2016.01)

(52) U.S. Cl.
CPC .... *H01M 8/04082* (2013.01); *H01M 8/04111* (2013.01); *H01M 8/04201* (2013.01); *H01M 8/04328* (2013.01); *H01M 8/04402* (2013.01); *H01M 8/04425* (2013.01); *H01M 8/04432* (2013.01); *H01M 8/04462* (2013.01); *H01M 8/04611* (2013.01); *H01M 8/04626* (2013.01); *H01M 8/04701* (2013.01); *H01M 8/04746* (2013.01); *H01M 8/04753* (2013.01); *H01M 8/04761* (2013.01); *H01M 8/04776* (2013.01); *H01M 8/04791* (2013.01); *H01M 8/04992* (2013.01)

(58) Field of Classification Search
CPC ........... H01M 8/04402; H01M 8/0441; H01M 8/04425; H01M 8/04432; H01M 8/04462; H01M 8/0447; H01M 8/04611; H01M 8/04626; H01M 8/04701; H01M 8/04746; H01M 8/04753; H01M 8/04761; H01M 8/04776; H01M 8/04791; H01M 8/04992
USPC ........................................................ 429/430
See application file for complete search history.

(56) References Cited

FOREIGN PATENT DOCUMENTS

| | | |
|---|---|---|
| DE | 102011109304 A1 | 2/2012 |
| DE | 102011007612 A1 | 10/2012 |
| DE | 102011088120 A1 | 6/2013 |
| JP | 2006-086117 A | 3/2006 |
| JP | 2006086117 A * | 3/2006 |
| JP | 2009-299480 A | 12/2009 |
| JP | 2009299480 A * | 12/2009 |

* cited by examiner

METHOD FOR DETERMINING A CONTENT OF A GAS COMPONENT IN A GAS MIXTURE CONVEYED IN A RECIRCULATING MANNER VIA A FUEL CELL

The invention relates to a method to determine a content of a delivered gas component in a gas mixture recirculating through an anode chamber or a cathode chamber of a fuel cell, wherein the delivery takes place via a delivery device functioning according to the positive displacement principle. The invention also relates to a fuel cell system configured to perform the method.

Fuel cells use the chemical conversion of a fuel with oxygen into water in order to generate electrical energy. For this purpose, fuel cells contain as a core component what is known as the membrane electrode assembly (MEA), which is an arrangement of an ion-conducting (usually proton-conducting) membrane and a catalytic electrode (anode and cathode), respectively arranged on both sides of the membrane. The latter generally comprise supported precious metals, in particular platinum. In addition, gas diffusion layers (GDL) can be arranged on both sides of the membrane electrode assembly, on the sides of the electrodes facing away from the membrane. Generally, the fuel cell is formed by a plurality of MEAs arranged in a stack, the electrical power outputs of which add up. Bipolar plates (also called flow field plates or separator plates) are generally arranged between the individual membrane electrode assemblies, which bipolar plates ensure a supply of the individual cells with the operating media, i.e. the reactants, and which are usually also used for cooling. In addition, the bipolar plates ensure an electrically conductive contact to the membrane electrode assemblies.

While the fuel cell is operating, the fuel (anode operating medium), in particular hydrogen $H_2$ or a hydrogen-containing gas mixture, is supplied via an anode-side open flow field of the bipolar plate of the anode where an electrochemical oxidation of $H_2$ into protons $H^+$ occurs with the release of electrons ($H_2 \rightarrow 2H^+ + 2e^-$). Protons are transported (water-bound or water-free) from the anode chamber into the cathode chamber across the electrolyte or membrane that separates and electrically insulates the reaction chambers gas tight from each other. The electrons provided at the anode are guided to the cathode via an electrical line. Oxygen or an oxygen-containing gas mixture (such as air) as the cathode operating medium is supplied to the cathode via a cathode-side open flow field of the bipolar plate so that a reduction of $O_2$ into $O^{2-}$ occurs with the uptake of electrons ($\frac{1}{2}O_2 + 2e^- \rightarrow O^{2-}$). At the same time, the oxygen anions react in the cathode chamber with the protons transported across the membrane to form water ($O^{2-} + 2H^+ \rightarrow H_2O$). While the fuel cell is operating, the anode operating medium, i.e., the fuel, is supplied in stoichiometric excess relative to the generated electrical current. For this reason, the anode exhaust gas leaving the fuel cell still contains significant quantities of the fuel, such as hydrogen. So that these do not leave the system unused, the anode exhaust gas is normally returned into the fresh anode operating medium via a recirculation line. However, due to diffusion processes through the polymer electrolyte membrane of the fuel cell, nitrogen and water arrive from the cathode side into the anode chambers of the fuel cell, so that an enrichment of these foreign components in the anode gas takes place. For this reason, the anode chambers are flushed with pure fuel from time to time, and the "aged" anode gas is discharged from the system. The control of the recirculation rate and of the flushing processes requires knowledge of both the volumetric flow flowing through the anode chambers and/or the recirculated volumetric flow, as well as knowledge of the nitrogen content or water content in the anode operating medium. In this context, sensors should be omitted if possible; consequently, these quantities must be determined by means of models. This requires the combined use of two models. One difficulty in this is that the unknown nitrogen or hydrogen concentration is at least indirectly included in the model for determining the volumetric flow, and conversely the unknown volumetric flow is incorporated into the model for determining the nitrogen or hydrogen concentration.

A procedure for determining the water concentration and recirculation volumetric flow of the anode gas is described in DE 10 2009 019 836 A1. In this method, the characteristic diagram of a recirculation blower and the pressure loss characteristic of the fuel cell stack are used. In an iterative process, first a random value is established for the hydrogen concentration, and an intermediate value of the recirculation volumetric flow is determined depending thereupon. Depending on the intermediate value of the volumetric flow, an intermediate value is calculated for the hydrogen concentration, and these steps are repeated sufficiently until the modeled intermediate value for the hydrogen concentration no longer significantly deviates from that of the preceding cycle. The method contains a complex fuel cell and lateral jet blower model, and cannot take into account any changes in the system.

Independently of which models or characteristic diagrams the method accesses to determine the two unknown operating parameters, a problem is apparent in that characteristic diagrams of components change over the life of the component, or the effects of production tolerances on the characteristic diagrams are not taken into account. For example, pressure losses of the fuel cell stacks or recirculation blowers deviate from one another because of production tolerances and change over the life of the components due to aging. These changes or deviations lead to model errors, and thus to imprecise determinations of the unknown target quantities. Moreover, known models are very complex and sometimes require additional measurands. The object of the invention is to provide a simple and robust method for determining a content of a gas component, or the composition of a delivered gas mixture recirculating through an anode chamber or cathode chamber of a fuel cell by means of a delivery device functioning according to the positive displacement principle.

These objects are achieved by a method as well as a fuel cell system having the features of the independent claims.

The method according to the invention provides that the determination of the content of the gas component takes place depending on geometric parameters and operating parameters of the delivery device, as well as on thermodynamic state variables (p, T) of the gas mixture. All of these parameters or state variables are data or quantities that are already known and are already detected in current fuel cell systems. Accordingly, the method permits a sufficiently precise determination of, for example, the composition of the recirculated anode operating gas exclusively on the basis of existing/known quantities and very simple models.

In a preferred embodiment, the geometric parameters of the delivery device comprise a volume enclosed and therefore deliverable between a housing and a rotor, as well as the design-dependent gap losses that reduce the delivered volume. In one embodiment, the operating parameters of the delivery device comprise its rotary speed, its voltage and its current. From the two last-cited parameters, the electrical power consumption can be determined. In another embodiment, the thermodynamic state variables of the gas mixture comprise its pressure as well as its temperature, in particular the pressure and temperature at the entry to the delivery device, and the pressure and temperature at the outlet from the delivery device.

According to an advantageous embodiment of the method, the content of the gas component is determined as a function of a volume displaced per rotation of the delivery device, which preferably is determined as a function of the volume enclosed by the delivery device as a geometric parameter and the rotary speed as an operating parameter of the delivery device. Accordingly, a volumetric flow delivered by the delivery device can be determined in a first approximation as a product of the enclosed volume and rotary speed.

According to a development, the volume displaced per rotation of the delivery device is furthermore determined as a function of the gap loss of the delivery device. The gap loss can thereby be determined from a characteristic diagram of the delivery device depending on a differential pressure across the delivery device. Although the gap loss also slightly depends on the gas composition, the gap loss can, in a very close approximation, be considered linear relative to the differential pressure, so that only a constant factor must to be stored in order to take into account the gap loss. By taking into account the gap loss, the precision of the determination of the volume displaced per rotation of the delivery device is improved.

In one embodiment of the method, the content of the gas component is determined as a function of a volumetric flow delivered by the delivery device that is determined depending on a volume enclosed by the delivery device, a rotary speed, and a gap loss of the delivery device. Accordingly, the delivered volumetric flow can be determined exclusively by known parameters.

According to another embodiment of the method, the content of the gas component is determined depending on an electrical power consumption by the delivery device, and/or the power output by the delivery device in the form of volume work. The electrical power consumption can thereby be determined simply as a function of a voltage and a current of the delivery device. The electrical power consumption and power output by the delivery device provide comparative quantities that are simple to ascertain, which can be determined independently of each other and in particular can be compared with each other within the context of an iterative method.

The power output of the delivery device, occurring in the form of volume work, is preferably determined as a function of a volumetric flow delivered by the delivery device, which in turn can be determined in the above-described manner.

A special embodiment of the method according to the invention comprises the following steps:
ascertaining an anticipated electrical power consumption by the delivery device, or an anticipated power output in the form of volume work of the delivery device, in each case for an assumed content of the gas component or a variable correlating herewith (such as the gas density);
ascertaining an actual electrical power consumption and/or an actual power output by the delivery device (taking place in the form of volume work) based thereupon;
comparison of the anticipated electrical power consumption or the anticipated power output with the actual electrical power consumption or the actual power output; and
correction of the content of the gas component or of the variable correlating therewith depending on the difference between the two compared outputs.

The anticipated power output in the first step can take place depending on the geometric parameters of the delivery device as well as on thermodynamic state variables of the gas mixture, in particular depending on the volumetric flow. The anticipated electrical power consumption by the delivery device in the first step can be ascertained from the anticipated power output and the total efficiency of the delivery device. The anticipated power consumption or power output is ascertained in each case for an assumed content of the gas component (or a quantity correlating herewith). The actual electrical power consumption in the second step can be ascertained from the measured voltage and the measured current, and the actual power output (shaft power) of the delivery device can be determined via the total efficiency of the delivery device from the actual electrical power consumption.

In other words, an anticipated output of the delivery device is ascertained on the one hand depending on the assumed content of the gas component or a quantity correlating herewith (i.e., a start value), and on the other hand an actual output of the delivery device is determined based on electrical operating parameters. In this manner, two comparable characteristic values can each be ascertained independently, and the assumed content of the gas component is confirmed or corrected from their difference.

The comparison with the corrected value for the gas component content or the quantity correlating therewith is preferably iterated until the actual electrical power consumption or power output agrees sufficiently with the anticipated power consumption or power output.

Another embodiment provides that a check and possibly correction of a model and/or characteristic diagram used in the method is performed at an operating point of the fuel cell in which the content of the gas component or gas composition is sufficiently known. For example, the gas composition and hence the gas density are sufficiently known after a start of the fuel cell, or after a longer standstill, and can be used as a starting point for the calibration. The performance parameters can thereby in turn be determined in the above-described manner and compared with each other. Depending on the size of the deviation between the two performance parameters of the delivery device compared with each other, either a calibration/adaptation can be performed, or a fault in the delivery device can be identified if the deviation is too great.

The correction of the model can, for example, comprise a redetermination of a model constant used in the calculation model, or a correction of a characteristic curve that is used in the method. Such a characteristic curve correction can, for instance, comprise an offset shift and/or a modified slope, or the like.

In one embodiment of the method, the recirculated gas mixture is an anode operating gas delivered through the anode chamber of the fuel cell. In particular, the gas component content is the fuel content (for example water content) or nitrogen content in the anode operating gas. The knowledge of the nitrogen content or fuel content in the anode chambers of the fuel cell serves in particular to control an anode gas recirculation, for example to control the means of delivery and/or a flushing valve in order to perform flushing processes due to excessive nitrogen enrichment. In the present case, the term "content" encompasses those quantities that describe the quantitative presence of the considered component in the gas mixture, such as the volume fraction, mass fraction, substance fraction, partial pressure, volume-related or mass-related concentration etc.

According to one embodiment, the method furthermore comprises controlling the operation of the fuel cell depending on the content of the gas component or the quantity correlating therewith. The control can thereby be performed in particular to control the anode gas recirculation within an anode supply of the fuel cell. This can comprise the controlling of the delivery device or of a flush valve of an anode gas flushing line.

The invention furthermore relates to a fuel cell system comprising a fuel cell, wherein the fuel cell system is configured to execute the method according to the invention for determining a content of a gas component in a delivered gas mixture recirculating through an anode chamber or cathode chamber of the fuel cell. For this purpose, the system can in particular comprise a control device in which corresponding computer-readable algorithms are stored. In addition, the control device can also contain the models, characteristic diagrams etc. needed for execution.

Another aspect of the invention relates to a vehicle that has such a fuel cell system. The vehicle is preferably an electric vehicle in which an electrical energy generated by the fuel cell system serves to supply an electric traction motor and/or a traction battery.

Additional preferred embodiments of the invention arise from the remaining features mentioned in the dependent claims.

The various embodiments of the invention mentioned in this application may be advantageously combined with one another unless stated otherwise in individual cases.

Figure 2:
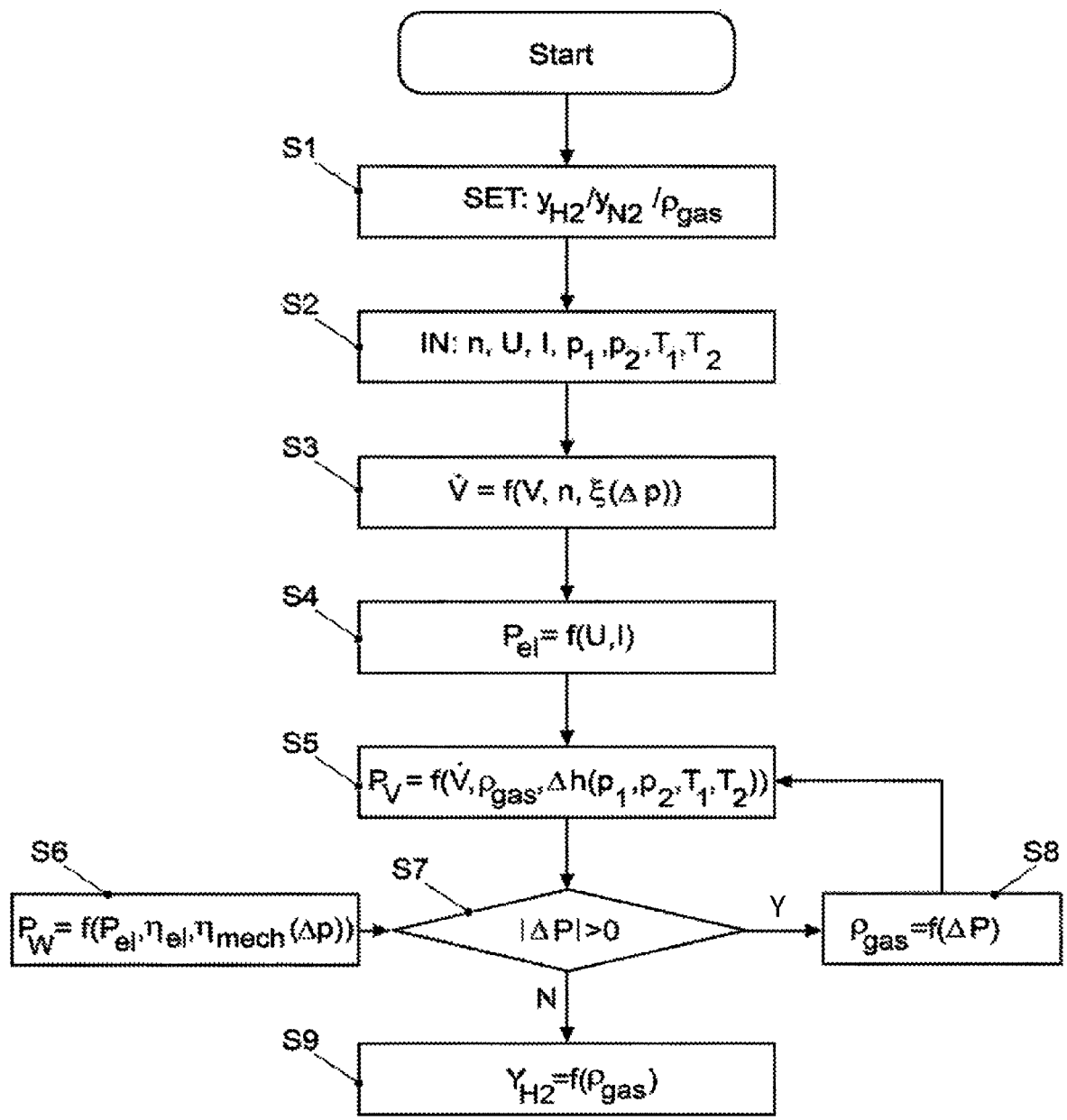
Figure 3:
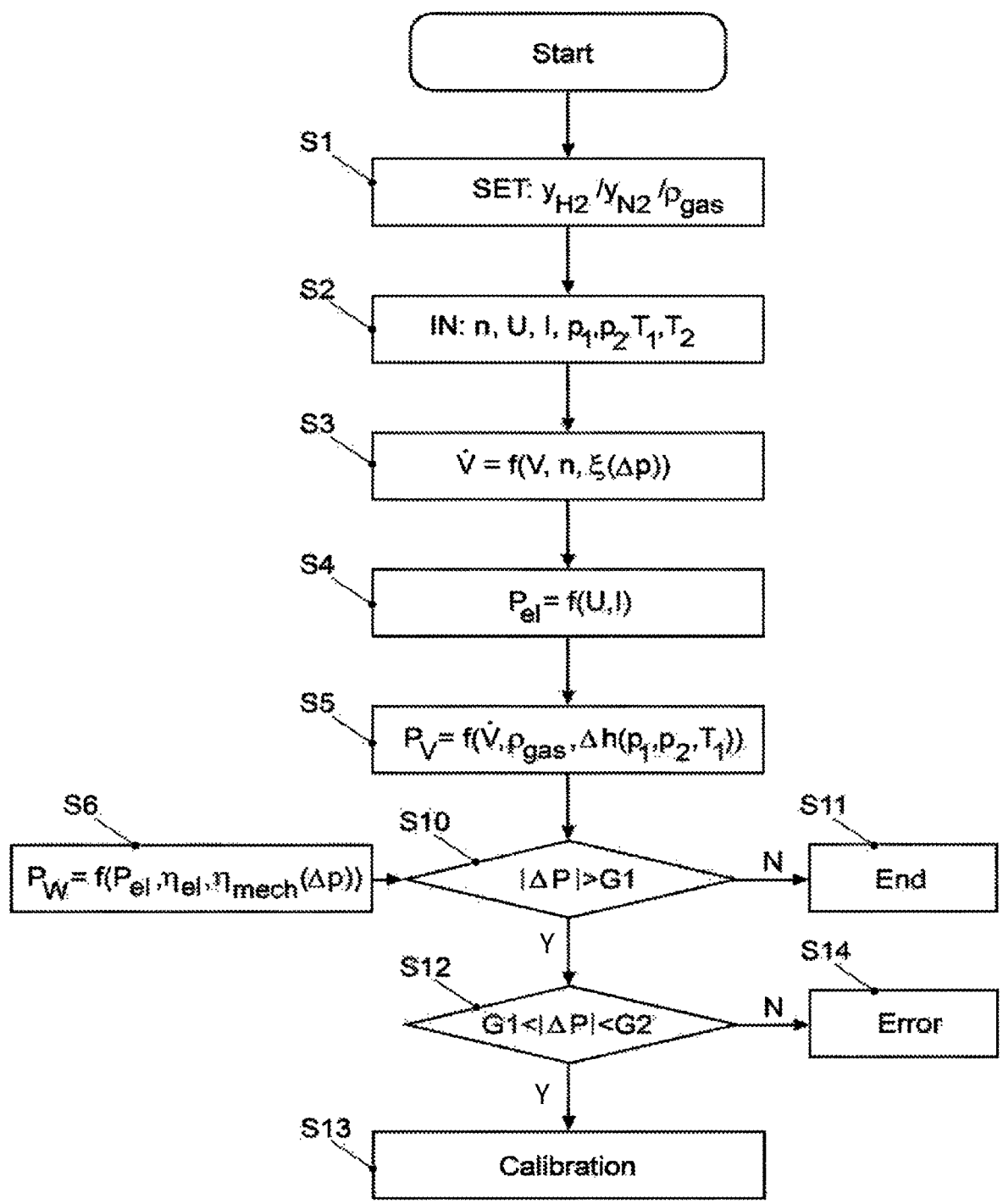

The invention is explained below in exemplary embodiments using the associated drawings. The following is shown:

FIG. 1 a block diagram of a fuel cell system according to a preferred embodiment;

FIG. 2 a flow chart of a method for determining a hydrogen and/or nitrogen content in a delivered gas mixture recirculating through the anode chamber of the fuel cell from FIG. 1, according to an embodiment of the invention, and FIG. 3 a flow chart of a method for correcting/calibrating a model used in the method from FIG. 2.

FIG. 1 shows a fuel cell system, denoted overall by 100, according to a preferred embodiment of the present invention. The fuel cell system 100 is part of a vehicle (not shown further), in particular an electric vehicle, which has an electric traction motor which is supplied with electrical energy by the fuel cell system 100.

The fuel cell system 100 comprises as a core component a fuel cell stack 10 (in the present case also referred to only as a fuel cell) which has a plurality of individual cells 11 arranged in the form of a stack that are formed by alternatingly stacked membrane electrode assemblies (MEA) 14 and bipolar plates 15 (see detail view). Each individual cell 11 accordingly comprises one MEA 14 that has an ion-conductive polymer electrolyte membrane or another solid electrolyte (not shown in detail here) as well as catalytic electrodes arranged on both sides, namely an anode and cathode, which catalyzes the respective partial reaction of the fuel cell conversion and can be formed as coatings on the membrane. The anode electrode and cathode electrode have a catalytic material, for example platinum, which is supported on an electrically conductive carrier material with a large specific surface, for example a carbon-based material. An anode space 12 is thus formed between a bipolar plate 15 and the anode, and the cathode space 13 is formed between the cathode and the next bipolar plate 15. The bipolar plates 15 serve to supply the operating media into the anode and cathode chambers 12, 13, and also establish the electrical connection between the individual fuel cells 11. Optionally, gas diffusion layers can be arranged between the membrane electrode assemblies 14 of the bipolar plates 15.

In order to supply the fuel cell stack 10 with the operating media, the fuel cell system 100 comprises on the one hand an anode supply 20 and on the other hand a cathode supply 30.

The anode supply 20 comprises an anode supply path 21 which serves to supply an anode operating medium (the fuel), for example hydrogen, into the anode chambers 12 of the fuel cell stack 10. For this purpose, the anode supply path 21 connects a fuel reservoir 23 to an anode inlet of the fuel cell stack 10. The anode operating pressure on the anode sides 12 of the fuel cell stack 10 is adjustable via an adjusting means 24 in the anode supply path 21. The anode supply 20 also comprises an anode exhaust gas path 22 which discharges the anode exhaust gas from the anode chambers 12 via an anode outlet of the fuel cell stack 10. In addition, the anode supply 20 has a recirculation line 25 that connects the anode exhaust gas path 22 to the anode supply path 21. The recirculation of fuel is customary in order to return the mostly over-stoichiometrically used fuel to the stack and to use it. A recirculation delivery device 26 is arranged in the recirculation line 25, by means of which a recirculated volumetric flow can be adjusted. Furthermore, the anode exhaust gas path 22 is connected to a flushing line 27 that, in the portrayed example, terminates in a cathode exhaust gas path 32, so that the anode exhaust gas and a cathode exhaust gas can be discharged via a common exhaust gas system. In an alternative embodiment, the flushing line 27 can also terminate in the environment. A flushing valve 28 that, in the present example, is combined with a water separator makes it possible on the one hand to discharge the anode exhaust gas via the flushing line 27 and on the other hand to separate condensed water.

The cathode supply 30 comprises a cathode supply path 31 which supplies an oxygen-containing cathode operating medium, in particular air which is drawn in from the environment, to the cathode chambers 13 of the fuel cell stack 10. The cathode supply 30 furthermore comprises a cathode exhaust gas path 32 that removes the cathode exhaust gas (in particular the exhaust air) from the cathode chambers 13 of the fuel cell stack 10 (here together with the anode exhaust gas) and, if applicable, supplies this to an exhaust gas system (not shown). A compressor 33 is arranged in the cathode supply path 31 for conveying and compressing the cathode operating medium. In the shown exemplary embodiment, the compressor 33 is designed as a compressor which is driven mainly by an electric motor, the driving of said compressor being effected via an electric motor 34 equipped with a corresponding power electronics system 35. The compressor 33 may also be driven by a turbine 36 (optionally with variable turbine geometry) arranged in the cathode exhaust path 32, supported via a common shaft (not shown).

In accordance with the illustrated exemplary embodiment, the cathode supply 30 can also have a wastegate line 37 which connects the cathode supply line 31 to the cathode exhaust line 32, i.e., represents a bypass of the fuel cell stack 10. The wastegate line 37 allows excess air mass flow to be directed past the fuel cell stack 10 without reducing the output of the compressor 33. An adjusting means 38 arranged in the wastegate line 37 serves to control the amount of the cathode operating medium bypassing the fuel cell stack 10. Further adjusting means can be arranged in the lines 21, 22, 27, 31 and 32 in order to be able to isolate the fuel cell stack 10 from the environment. All adjusting means of the fuel cell system 100 can be designed as controllable or non-controllable valves or flaps.

The fuel cell system 100 can furthermore have a humidifier 39. The humidifier 39 is on the one hand arranged in the cathode supply path 31 such that the cathode operating gas can flow through it. On the other hand, it is arranged in the cathode exhaust path 32 so that the cathode exhaust gas can flow through it. The humidifier 39 typically has a plurality of membranes permeable to water vapor which are designed to be either flat or in the form of hollow fibers. The comparatively dry cathode operating gas (air) thereby flows over one side of the membranes, and the comparatively moist cathode exhaust gas (exhaust gas) flows over the other side. Driven by the higher partial pressure of water vapor in the cathode exhaust gas, water vapor passes across the membrane into the cathode operating gas, which is humidified in this way. A water separator can also be installed in the cathode exhaust gas path 32, in particular upstream of the turbine 36, in order to condense and drain the product water arising from the fuel cell reaction.

Usually, in the normal operation of the fuel cell stack 10 the anode operating gas, in this case hydrogen for example, is operated with a stoichiometric excess relative to the generated electrical current. Accordingly, the anode exhaust gas leaving the fuel cell stack 10 via the anode exhaust gas path 22 contains substantial amounts of hydrogen that, in normal operation, are fed via the recirculation line 25 by the delivery device 26, that in the present case is designed as a positive displacement machine, into the anode supply path 21, and thus are recirculated. However, since nitrogen and product water of the fuel cell reaction can diffuse from the cathode chambers 13 into the anode chambers 12 of the fuel cell 10 across the membrane of the membrane electrode assembly 14, these components are enriched in the anode gas, resulting in a decreasing hydrogen content and increasing nitrogen content. For this reason, if the nitrogen content becomes too high or the hydrogen content becomes too low, the flushing valve 28 is opened and the anode chambers 12 are flushed with pure hydrogen from the fuel tank 23.

To control the flushing valve 28, the recirculation delivery device 26, and other components of the system 100, the fuel cell system 100 from FIG. 1 furthermore comprises a control device 50 in which different measuring parameters are incorporated. For the purpose of recirculation control, the control device 50 comprises a stored and computer-readable algorithm for determining the content of fuel, here hydrogen $y_{H2}$, in the delivered anode gas recirculating through the anode chambers 12 of the one fuel cell 10. Operating parameters of the delivery device 26, i.e., its rotary speed n, its voltage U and its current I, are incorporated into the control device 50 for the same purpose. Moreover, thermodynamic state variables of the recirculated gas mixture are measured by suitable sensors and supplied to the control device 50. These comprise an input temperature $T_1$ and an output temperature $T_2$, as well as an input pressure $p_1$ and an output pressure $p_2$ of the gas mixture, which are ascertained upstream or, respectively, downstream of the delivery device 26. Furthermore, the control device 50 contains information about various geometric parameters of the delivery device 26, i.e., a volume V enclosed thereby as well as information about a gap loss $\xi$ that depends on the differential pressure $\Delta p$ over the delivery device 26. Depending on the ascertained content of hydrogen (or nitrogen) in the recirculated gas mixture, the control device 50 correspondingly controls the flushing valve 28 and the delivery device 26.

A corresponding method for ascertaining the content of hydrogen (or nitrogen) in the recirculated gas mixture is explained in an exemplary embodiment using the flow chart in FIG. 2.

For example, the method starts with the start of the fuel cell system 100 after a vehicle stop. In S1, a start value is assumed for the content of the gas component to be determined, or of the gas composition, for example for the hydrogen content $y_{H2}$, the nitrogen content $y_{N2}$ or the gas density $\rho_{gas}$ of the anode gas. Since these quantities can be converted into each other, it does not matter which of these quantities is selected as the starting point. For example, directly after a start of the fuel cell system 100, the water content is set as 100% ($y_{H2}=1.0$), which yields a value of 0% for the nitrogen fraction ($y_{N2}=0.0$), and the gas density $\rho_{gas}$ corresponds to that of hydrogen.

In the subsequent step S2, the current values for the rotary speed n, the voltage U and the current I of the delivery device 26, as well as input and output pressure $p_1$ and $p_2$ and input and output temperature $T_1$ and $T_2$, are imported.

In step S3, a calculation takes place of the volumetric flow $\dot{V}$ delivered by the delivery device 26 as a function of the volume V enclosed by the delivery device between the rotors and the housing of said delivery device, of the rotary speed n, and of the gap loss $\xi$. The volumetric flow results from the product of the enclosed volume V and the rotary speed n, minus the gap loss $\xi$ (equation 1). The latter is dependent on the differential pressure $\Delta p = p_2 - p_1$ across the delivery device 26, and can be represented in a good approximation as a product of $\Delta p$ and a geometric factor a of the delivery device 26 (equation 2), so that the volumetric flow $\dot{V}$ results from the geometric and operating parameters of the delivery device 26 and the differential pressure $\Delta p$ according to equation 3.

$$\dot{V} = V*n - \xi \quad (1)$$

$$\xi = f(\Delta p) = a*\Delta p \quad (2)$$

$$\dot{V} = V*n - a*\Delta p \quad (3)$$

In step S4, according to equation 4 the electric power consumption $P_{el}$ of the delivery device 26 is determined from the product of the measured voltage U and amperage I. The electric power consumption determined in this manner corresponds to the actual power consumption $P_{el,real}$.

$$P_{el} = U*I \quad (4)$$

Determined in step S5 is the output power $P_V$ anticipated for the assumed gas density $\rho_{Gas}$ that the delivery device 26 produces in the form of volume work (compression work, "gas work"). According to equation 5, the output power $P_V$ can be expressed as a product of the mass flow $\dot{m}$ and the difference of the specific enthalpy $\Delta h$ of the gas at the inlet and outlet of the delivery device 26. Using the definition of the density according to equation 6, according to equation 7 the output power $P_V$ results depending on the gas density $\rho_{Gas}$ assumed in step S1, the volumetric flow $\dot{V}$ determined in S3, and the polytropic enthalpy difference $\Delta h$ that results according to equations 8 and 9 from the input and output pressure $p_1$ and $p_2$ and the input and output temperature $T_1$ and $T_2$. R is the general gas constant (R=8.314 J/(mol*K)).

$$P_V = \dot{m} * \Delta h \quad (5)$$

$$\rho_{Gas} = \frac{\dot{m}}{\dot{V}} \quad (6)$$

$$P_V = \rho_{Gas} * \dot{V} * \Delta h(T_1, T_2, p_1, p_2) \quad (7)$$

$$\Delta h = \frac{n}{n-1} * R * (T_2 - T_1) \quad (8)$$

$$n = \frac{\ln \frac{p_2}{p_1}}{\ln \frac{p_2}{p_1} - \ln \frac{T_2}{T_1}} \quad (9)$$

In step S6, according to equation 10 the output power $P_W$ (shaft power) is determined from the electrical power consumption $P_{el}$ determined in step S4 and a mechanical efficiency $\eta_{mech}$ of the delivery device 26 that is learned from a characteristic diagram depending on the differential pressure $\Delta p$, and the electrical efficiency $\eta_{el}$ of the delivery device 26.

$$P_W = P_{el} * \eta_{mech} * \eta_{el} \quad (10)$$

In step S7, a comparison is then carried out in which the output power $P_V$ from S5 anticipated for the assumed gas density $\rho_{Gas}$ is compared with the output power $P_W$. In particular, it is checked whether the magnitude of the difference $\Delta P$ between the two deviates (significantly) from zero, wherein a certain tolerance is taken into account. If this is the case, i.e., the anticipated output power $P_V$ depending on the assumed gas density $\rho_{Gas}$ deviates significantly from the shaft power $P_W$ ascertained from the electrical power consumption $P_{el}$, the query in S7 is responded to in the affirmative and step S8 follows. In S8, the gas density $\rho_{Gas}$ is again determined depending on the differential power $\Delta P$ using the preceding equations. The method returns from S8 to step S5, in which the anticipated output power $P_V$ is recalculated using the redetermined gas density $\rho_{Gas}$ and is subjected to another comparison with the output power $P_W$ in S7.

If the query is responded to in the negative in S7, i.e., the output power $P_V$ anticipated depending on the gas density $\rho_{Gas}$ agrees sufficiently with the output power $P_W$ anticipated from the electrical power consumption $P_{el}$, this means that the most recently established gas density $\rho_{Gas}$ corresponds to the actual density of the recirculated gas mixture. In this instance, the method proceeds to step S9, where the content of hydrogen $y_{H2}$ is calculated. This proceeds on the basis of equation 11, according to which the gas density $\rho_{Gas}$ of the gas mixture corresponds to the sum of the products of all fractions of the gas component in the gas mixture and their densities, wherein according to equation 12 the sum of the fractions of all gas components is equal to 1. Solved for the content of hydrogen $y_{H2}$, equation 13 results.

$$\rho_{Gas} = y_{H_2} * \rho_{H_2}(p,T) + y_{N_2} * \rho_{N_2}(p,T) + y_{H_2O} * \rho_{H_2O}(p,T) \quad (11)$$

$$1 = y_{H_2} + y_{N_2} + y_{H_2O} \quad (12)$$

$$y_{H_2} = \frac{\rho_{H_2} - \rho_{Gas} - y_{H_2O} * (\rho_{N_2} + \rho_{H_2O})}{\rho_{N_2} - \rho_{H_2}} \quad (13)$$

Assuming that the gas mixture is saturated with water vapor, i.e., the relative humidity is 100%, the water content $y_{H2O}$ is learned from a table stored in the model. (Alternatively, the water content $y_{H2O}$ can be derived as a model-based quantity from the operating conditions.) Likewise, the densities of hydrogen, water vapor, and nitrogen are stored in the model depending on the pressure and temperature, so that only the previously-determined gas density $\rho_{Gas}$ is used in the calculation as an input quantity.

It is understood that the corresponding input powers can also be compared with each other instead of comparing the output powers in step S7, i.e., the current input power $P_{el}$ determined in S4 and the anticipated electrical input power to be anticipated from the anticipated output power $P_V$ ascertained in S5 using the efficiencies $\eta_{mech}(\Delta p)$ and $\eta_{el}$. Furthermore, the nitrogen content can also be determined instead of the hydrogen content, or in addition thereto.

As long as the total efficiency $\eta_{tot}$ of the delivery device/positive displacement machine 26 remains constant, the model has a sufficient precision. In practice, however, over the life of the delivery device a change in its total efficiency $\eta_{tot}$ can occur, in particular if the mechanical efficiency $\eta_{mech}$ changes. According to equation 14, the total efficiency $\eta_{tot}$ is composed of the sum of the electrical efficiency $\eta_{el}$, the thermodynamic efficiency $\eta_{ther}$ and the mechanical efficiency $\eta_{mech}$, wherein according to equation 15, the thermodynamic efficiency $\eta_{ther}$ results depending on the isentropic enthalpy difference $\Delta h_{isen}$ and the polytropic enthalpy difference $\Delta h_{poly}$ across the delivery device 26.

$$\eta_{ges} == \eta_{el} * \eta_{ther} * \eta_{mech} \quad (14)$$

$$\eta_{ther} == \left(\frac{\Delta h_{isen}}{\Delta h_{poly}}\right) \quad (15)$$

$$\eta_{mech} = \frac{\eta_{tot}}{\eta_{el} * \eta_{ther}} \quad (16)$$

The method also makes it possible to check and, if applicable, correct the model and/or the characteristic diagrams used in the method, as well as perform a diagnosis of the delivery device 26. A corresponding method will be explained in an exemplary embodiment using FIG. 3.

In step S1, the diagnostic and calibration method according to FIG. 3 starts at an operating point in which the gas composition and therefore the gas density $\rho_{Gas}$ is sufficiently known. For example, this is the case directly after a start of the fuel cell 10, namely when the anode operating gas consists of 100% hydrogen, or after a long shutoff phase when a pure air atmosphere can be assumed in the anode chambers 12 due to diffusion processes.

Steps S2 to S6 follow, which correspond to those from FIG. 2 and will not be addressed again in detail.

Contrary to FIG. 2, however, the power difference $\Delta P$ between the output power $P_V$ from S5 that is anticipated depending on the gas density $\rho_{Gas}$ and the output power $P_W$ ascertained based on the electrical power consumption $P_{el}$ are compared with limit values G1 and G2. Accordingly, the query S10 initially asks whether the ascertained power difference $\Delta P$ lies above a first threshold G1. If this is not the case, the system calibration is okay, and the employed models and characteristic diagrams, in particular the efficiency dependency in S6, are sufficiently precise. In this case, the method ends at step S11.

On the other hand, if it is found in S10 that the power difference $\Delta P$ exceeds the first limit value G1, the next query in S12 investigates whether $\Delta P$ lies within a range between the first limit value G1 and a second, higher limit value G2. If this is the case, however, if the deviation is still within an acceptable range a calibration of the employed model is required, in particular of the total efficiency the $\eta_{tot}$. This takes place in step S13.

If the query in S12 is answered in the negative, however, i.e., ΔP lies above G2, the method proceeds to step S14. For example, an excessive deviation can indicate mechanical bearing damage of the delivery device 26 that has led to a drastic worsening of the mechanical efficiency $\eta_{mech}$, and hence of the total efficiency $\eta_{tot}$. In this case, a system calibration is no longer possible and an error is identified that, for example, is stored in an error memory of the vehicle, and/or is indicated visually or acoustically as an error message.

LIST OF REFERENCE SYMBOLS

100 Fuel cell system
10 Fuel cell stack/fuel cell
11 Individual cell
12 Anode chamber
13 Cathode chamber
14 Membrane electrode assembly (MEA)
15 Bipolar plate (separator plate, flow field plate)
20 Anode supply
21 Anode supply path
22 Anode exhaust path
23 Fuel tank
24 Adjusting means
25 Recirculation line
26 Recirculation delivery device/positive displacement machine
27 Flushing line
28 Flushing valve
30 Cathode supply
31 Cathode supply path
32 Cathode exhaust path
33 Compressor
34 Electric motor
35 Power electronics
36 Turbine
37 Wastegate line
38 Adjusting means
39 Humidifier
50 Control device
$\dot{V}$ Volumetric flow
V Enclosed volume of the delivery device/positive displacement machine
ξ Gap loss
A Gap loss factor
n Rotary speed of the delivery device/positive displacement machine
U Voltage of the delivery device/positive displacement machine
I Current of the delivery device/positive displacement machine
$T_1$ Temperature of the gas mixture at the entry to the delivery device/positive displacement machine
$T_2$ Temperature of the gas mixture at the exit to the delivery device/positive displacement machine
$P_1$ Pressure at the entry to the delivery device/positive displacement machine
$P_2$ Pressure at the exit of the delivery device/positive displacement machine
Δp Differential pressure across the delivery device/positive displacement machine
$P_{el}$ Electrical power consumption of the delivery device/positive displacement machine
$P_V$ Anticipated output power of the delivery device/positive displacement machine (determined from gas density) delivered due to volume work of the gas mixture
$P_W$ Actual output power/shaft power of the delivery device/positive displacement machine (determined from the electrical power consumption and efficiency) delivered due to volume work of
$\dot{m}$ Mass flow
Δh Specific enthalpy difference
R General gas constant, R=8.314 J/(K mol)
$\eta_{tot}$ Total efficiency of the delivery device/positive displacement machine
$\eta_{el}$ Electrical efficiency of the delivery device/positive displacement machine
$\eta_{th}$ Thermodynamic efficiency of the delivery device/positive displacement machine
$\eta_{mech}$ Mechanical efficiency of the delivery device/positive displacement machine
ρ Density
$\rho_{Gas}$ Density of the gas mixture
$y_{H2}$ Content/partial pressure/substance fraction of hydrogen in the gas mixture
$y_{N2}$ Content/partial pressure/substance fraction of nitrogen in the gas mixture
$y_{H2O}$ Content/partial pressure/substance fraction of water vapor in the gas mixture

The invention claimed is:

1. A method, comprising:
   delivering via a delivery device a gas mixture recirculating through an anode chamber or a cathode chamber of a fuel cell, the delivery device functioning according to a positive displacement principle;
   determining a content of a gas component via geometric parameters of the delivery device, operating parameters of the delivery device, and thermodynamic state variables of the gas mixture, wherein the content of the gas component is determined as a function of an electrical power output of the delivery device that is achieved in a form of volume work, wherein the electrical power output of the delivery device is determined as a function of the electrical power consumption of the delivery device, a mechanical efficiency of the delivery device, and an electrical efficiency of the delivery device, and wherein the mechanical efficiency of the delivery device is determined as a function of a differential pressure across the delivery device; and
   controlling a flushing valve and the delivery device based on a result of the determining of the content of the gas component.

2. The method according to claim 1, wherein the electrical power output is determined as a function of a volumetric flow delivered by the delivery device.

3. The method according to claim 1, comprising checking a system calibration at an operating point of the fuel cell in which the content of the gas component or gas composition is known.

4. The method according to claim 1, comprising correcting a model or a characteristic diagram at an operating point of the fuel cell in which the content of the gas component or gas composition is known.

5. The method according to claim 1, comprising determining the content of the gas component as a function of a volumetric flow delivered by the delivery device via ascertaining a volume enclosed by the delivery device, a rotary speed of the delivery device, and a gap loss of the delivery device.

6. The method of claim 1 wherein the content of the gas component is determined as a function of the electrical power consumption of the delivery device and the electrical power consumption of the delivery device is determined as a product of a measured voltage and a measured amperage of the delivery device.

7. The method according to claim 1, comprising determining the content of the gas component as a function of a volume delivered per rotation of the delivery device.

8. The method according to claim 7, comprising determining the volume delivered per rotation of the delivery device as a function of a gap loss of the delivery device that is ascertained based on a differential pressure across the delivery device.

9. The method according to claim 7, wherein determining the content of the gas component as the function of the volume delivered per rotation of the delivery device comprises determining a volume enclosed by the delivery device and a rotary speed of the delivery device.

10. The method according to claim 1, comprising:
ascertaining anticipated electrical power consumption of the delivery device, or an anticipated power output of the delivery device in the form of volume work, wherein the ascertaining includes assuming at least one of: the content of the gas component or a quantity that correlates with the content of the gas component;
ascertaining an actual electrical power consumption, or an actual power output of the delivery device;
comparing the anticipated electrical power consumption or the anticipated power output with the actual electrical power consumption or the actual power output; and
in response to the comparing, correcting the content of the gas component or of the quantity correlating therewith.

11. The method according to claim 10, comprising iterating comparing of the anticipated electrical power consumption or the anticipated power output with the actual electrical power consumption or the actual power output until a difference between actual electrical power consumption or the actual power output and the anticipated electric power consumption or the anticipated power output is within a certain defined threshold.

12. A fuel cell system comprising:
a fuel cell having an anode chamber and a cathode chamber;
a recirculating line through which a gas mixture recirculating through the anode chamber or the cathode chamber is delivered;
a delivery device; and
a controller coupled to the delivery device, the controller configured to determine a content of a gas component in the gas mixture recirculating through the anode chamber or the cathode chamber of the fuel cell and control a flushing valve and the delivery device based on the content of the gas component in the gas mixture, wherein the content of the gas component is determined as a function of an electrical power output of the delivery device that is achieved in a form of volume work, wherein the electrical power output of the delivery device is determined as a function of the electrical power consumption of the delivery device, a mechanical efficiency of the delivery device, and an electrical efficiency of the delivery device, and wherein the mechanical efficiency of the delivery device is determined as a function of a differential pressure across the delivery device.

13. The fuel cell system according to claim 12, wherein the controller is configured to determine the content of the gas component as a function of a volume delivered per rotation of the delivery device.

14. The fuel cell system according to claim 12, wherein the controller is configured to determine a volume delivered per rotation of the delivery device as a function of a gap loss of the delivery device that is ascertained based on a differential pressure across the delivery device.

15. The fuel cell system according to claim 12, wherein the controller is configured to:
ascertain an anticipated electrical power consumption of the delivery device, or an anticipated power output of the delivery device in a form of volume work, wherein the ascertaining includes assuming at least one of: the content of the gas component or a quantity that correlates with the content of the gas component;
ascertain an actual electrical power consumption, or an actual power output of the delivery device;
compare the anticipated electrical power consumption or the anticipated power output with the actual electrical power consumption or the actual power output; and
in response to a difference between the comparison, correct the content of the gas component or of the quantity correlating therewith.

* * * * *